(12) United States Patent
Geng

(10) Patent No.: US 11,405,678 B2
(45) Date of Patent: Aug. 2, 2022

(54) LIVE STREAMING INTERACTIVE METHOD, APPARATUS, ELECTRONIC DEVICE, SERVER AND STORAGE MEDIUM

(71) Applicant: BEIJING DAJIA INTERNET INFORMATION TECHNOLOGY CO., LTD., Beijing (CN)

(72) Inventor: Zhenjian Geng, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/139,853

(22) Filed: Dec. 31, 2020

(65) Prior Publication Data

US 2021/0266631 A1    Aug. 26, 2021

(30) Foreign Application Priority Data

Feb. 25, 2020  (CN) .......................... 202010117675.X

(51) Int. Cl.
*H04N 21/431* (2011.01)
*H04N 21/2187* (2011.01)
*H04N 21/442* (2011.01)

(52) U.S. Cl.
CPC ..... *H04N 21/4312* (2013.01); *H04N 21/2187* (2013.01); *H04N 21/44218* (2013.01); *H04N 21/44222* (2013.01)

(58) Field of Classification Search
CPC .......... H04N 21/4312; H04N 21/2187; H04N 21/44218; H04N 21/44222; H04N 21/431;

(Continued)

(56) References Cited

U.S. PATENT DOCUMENTS

2016/0277802 A1  9/2016 Bernstein et al.
2016/0335684 A1* 11/2016 You .................. H04L 67/42
(Continued)

FOREIGN PATENT DOCUMENTS

CN    105959127 A    9/2016
CN    107172488 A    9/2017
(Continued)

OTHER PUBLICATIONS

Y. Chen and F. Xiong, "The Business Model of Live Streaming Entertainment Services in China and Associated Challenges for Key Stakeholders," in IEEE Access, vol. 7, pp. 116321-116327, 2019, doi: 10.1109/ACCESS.2019.2935005. (Year: 2019).*

(Continued)

*Primary Examiner* — Cynthia M Fogg
(74) *Attorney, Agent, or Firm* — Foley & Lardner LLP

(57) ABSTRACT

The disclosure relates to a live streaming interactive method, apparatus, electronic device, server and storage medium, so as to at least solve the problem of single function of live video streaming. The method includes invoking preset animation information corresponding to a preset operation instruction in response to the preset operation instruction reaching a preset condition. The method includes rendering the preset animation information to obtain a preset animation. The method includes displaying the preset animation on a current live streaming interface. The preset operation instruction is used to express emotions to a first user corresponding to a first user account, and the first user account is a user account with preset permissions in a current live streaming room corresponding to the current live streaming interface.

15 Claims, 7 Drawing Sheets

(58) Field of Classification Search
CPC .............. H04N 21/442; H04N 21/4788; H04N 21/632; H04N 21/4784; H04N 21/2541; H04N 21/25866; H04N 21/435; H04N 21/81; H04N 21/8146; H04N 21/8545
USPC .......................................................... 725/37
See application file for complete search history.

(56) References Cited

U.S. PATENT DOCUMENTS

| | | | |
|---|---|---|---|
| 2017/0200202 A1* | 7/2017 | Yu | G06Q 30/0215 |
| 2017/0374391 A1* | 12/2017 | Akagawa | H04N 21/2187 |
| 2018/0124477 A1 | 5/2018 | Qu et al. | |
| 2018/0165888 A1* | 6/2018 | Duan | H04M 1/72427 |
| 2019/0102366 A1* | 4/2019 | Li | G06F 40/117 |
| 2021/0204001 A1* | 7/2021 | Xie | H04L 67/306 |

FOREIGN PATENT DOCUMENTS

| | | | | |
|---|---|---|---|---|
| CN | 107241636 A | 10/2017 | | |
| CN | 109246452 A | 1/2019 | | |
| CN | 109688477 A | 4/2019 | | |
| CN | 110225408 A | 9/2019 | | |
| EP | 3 276 976 A1 | 1/2018 | | |
| WO | WO-2018024137 A1 * | 2/2018 | ............. | G06F 21/10 |
| WO | WO-2018045873 A1 * | 3/2018 | ......... | G06F 3/04812 |
| WO | WO-2019128531 A1 * | 7/2019 | ......... | G06F 3/04812 |

OTHER PUBLICATIONS

Chinese Office Action dated Sep. 22, 2020, from application No. 202010117675.X.

Extended European Search Report dated Jun. 17, 2021, from application No. 21159055.9, 7 pages.

* cited by examiner

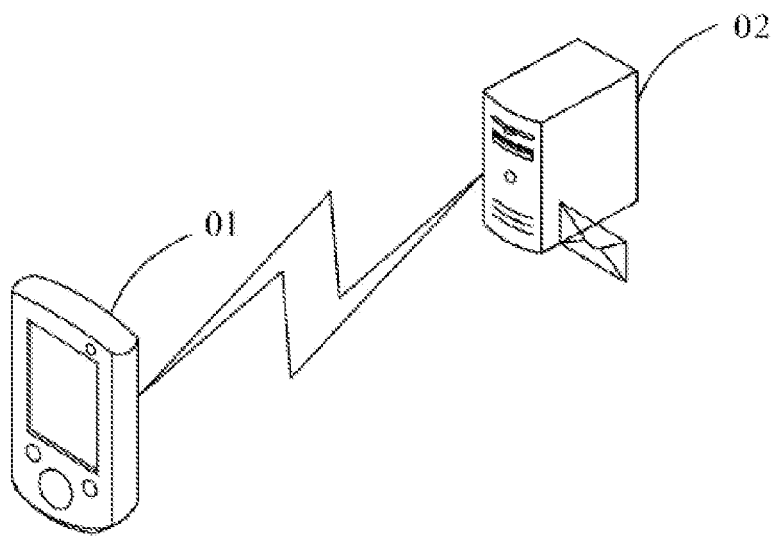
FIG. 1
invoking preset animation information corresponding to the preset operation instruction in response to the first electronic device detecting that the preset operation instruction reaches the preset condition — S11a
FIG. 1a
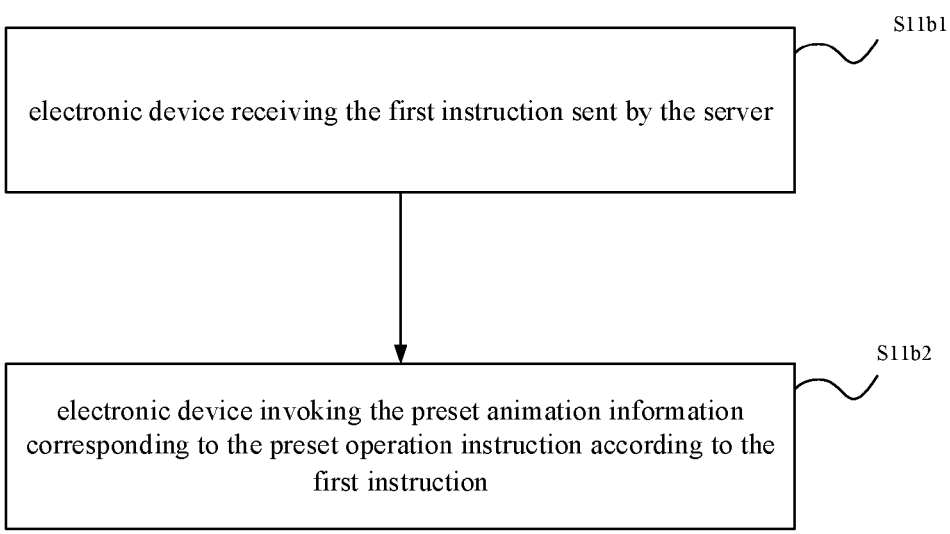
FIG. 1b

LIVE STREAMING INTERACTIVE METHOD, APPARATUS, ELECTRONIC DEVICE, SERVER AND STORAGE MEDIUM

CROSS-REFERENCE TO RELATED APPLICATIONS

This application is based upon and claims priority to Chinese Patent Application No. 202010117675.X, filed Feb. 25, 2020, the entire contents of which are incorporated herein by reference.

TECHNICAL FIELD

The disclosure relates to the field of Internet technology, and in particular to a live streaming interactive method, apparatus, electronic device, server, and storage media.

BACKGROUND

With continuous development of network technology, operators have provided various live video streaming platforms. During the live video streaming, an electronic device of the host user can display a virtual item record in a live streaming interface. The virtual item record is used to record virtual gift information that the host user hopes to obtain, which is usually called a wish list. In this way, the viewer user device can present virtual gifts recorded in the virtual item record to the host user device, so that the host user can fulfill his wish.

In related technologies, the live streaming platform only counts virtual items, and when the count of the virtual gifts reaches the value set by the host user, it is determined that the live streaming wish corresponding to the virtual gift has been achieved, and the overall live video streaming function is relatively simple.

SUMMARY

The disclosure provides a live streaming interactive method, apparatus, electronic device, server and storage medium.

The technical solutions of the disclosure are as follows.

According to a first aspect of implementations the disclosure, there is provided a live streaming interactive method, applied to an electronic device and including: invoking preset animation information corresponding to a preset operation instruction in response to the preset operation instruction reaching a preset condition; rendering the preset animation information to obtain a preset animation; and displaying the preset animation on a current live streaming interface. The preset operation instruction is used to express emotions to a first user corresponding to a first user account, and the first user account is a user account with preset permissions in a current live streaming room corresponding to the current live streaming interface.

According to the first aspect, in a first possible implementation, before invoking preset animation information corresponding to the preset operation instruction, the live streaming interactive method provided by implementations of the disclosure further includes: receiving a first instruction sent by a server. The first instruction is used to indicate that the preset operation instruction reaches the preset condition, where said invoking preset animation information corresponding to the preset operation instruction includes: invoking preset animation information corresponding to the preset operation instruction according to the first instruction.

According to the first aspect, in a second possible implementation, the live streaming interactive method provided by implementations of the disclosure further includes extracting N target virtual resources corresponding to the preset operation instruction from the first user account in response to the preset operation instruction reaching the preset condition. N is a preset value and is a positive integer. The method includes determining information of a virtual red envelope according to the target virtual resource. The method includes displaying the virtual red envelope on the current live streaming interface according to the information of the virtual red envelope.

According to the first aspect, in a third possible implementation, the live streaming interactive method provided by implementations of the disclosure further includes receiving a second instruction sent by a server. The second instruction carries information of a virtual red envelope, and the second instruction is an instruction generated in response to the preset operation instruction reaching the preset condition. The method includes displaying the virtual red envelope on the current live streaming interface according to the information of the virtual red envelope.

According to the first aspect, in a fourth possible implementation, the electronic device is a first electronic device, and the first electronic device is an electronic device that logs in the first user account, where said invoking preset animation information corresponding to the preset operation instruction in response to the preset operation instruction reaching the preset condition includes: invoking preset animation information corresponding to the preset operation instruction in response to the first electronic device detecting that the preset operation instruction reaches the preset condition.

According to the first aspect, in a fifth possible implementation, the electronic device is a first electronic device, and the first electronic device is an electronic device that logs in the first user account, where after invoking preset animation information corresponding to the preset operation instruction, the live streaming interactive method provided by implementations of the disclosure further includes sending the preset animation information to a second electronic device. The first electronic device and the second electronic device are electronic devices in the current live streaming room.

According to a second aspect of implementations of the disclosure, there is provided a live streaming interactive method, applied to a server and including receiving a preset operation instruction sent by a second electronic device. The preset operation instruction is used to express emotions to a first user corresponding to a first user account, and the first user account is a user account with preset permissions in a current live streaming room. The method includes sending a first instruction to a target electronic device in the current live streaming room in response to detecting that the preset operation instruction reaches a preset condition. The first instruction is used to indicate that the preset operation instruction reaches the preset condition. The target electronic device includes at least one of: the second electronic device, a first electronic device that logs in the first user account.

According to the second aspect, in a first possible implementation, the live streaming interactive method provided by implementations of the disclosure further includes extracting N target virtual resources corresponding to the preset operation instruction from the first user account in response to the preset operation instruction reaching the preset condition. N is a preset value and is a positive integer.

The method includes determining information of a virtual red envelope according to the target virtual resource. The method includes sending a second instruction to the target electronic device. The second instruction carries information of a virtual red envelope.

According to a third aspect of implementations of the disclosure, there is provided a live streaming interactive apparatus, including: an invoking module, configured to invoke preset animation information corresponding to a preset operation instruction in response to the preset operation instruction reaching a preset condition; a rendering module, configured to render the preset animation information invoked by the invoking module to obtain a preset animation; a display module, configured to display the preset animation obtained by the rendering module on a current live streaming interface. The preset operation instruction is used to express emotions to a first user corresponding to a first user account, and the first user account is a user account with preset permissions in a current live streaming room corresponding to the current live streaming interface.

According to the third aspect, in a first possible implementation, the live streaming interactive apparatus further includes a receiving module, configured to receive a first instruction sent by a server. The first instruction is used to indicate that the preset operation instruction reaches the preset condition. The invoking module is further configured to invoke preset animation information corresponding to the preset operation instruction according to the first instruction received by the receiving module.

According to the third aspect, in a second possible implementation, the live streaming interactive apparatus further includes an extracting module, configured to extract N target virtual resources corresponding to the preset operation instruction from the first user account in response to the preset operation instruction reaching the preset condition. N is a preset value and is a positive integer. The apparatus includes a determining module, configured to determine information of a virtual red envelope according to the target virtual resource extracted by the extracting module. The display module is further configured to display the virtual red envelope on the current live streaming interface according to the information of the virtual red envelope determined by the determining module.

According to the third aspect, in a third possible implementation, the live streaming interactive apparatus further includes a receiving module, configured to receive a second instruction sent by a server. The second instruction carries information of a virtual red envelope, and the second instruction is an instruction generated in response to the preset operation instruction reaching the preset condition. The display module is further configured to display the virtual red envelope on the current live streaming interface according to the information of the virtual red envelope.

According to the third aspect, in a fourth possible implementation, the live streaming interactive apparatus is a first electronic device, and the first electronic device is an electronic device that logs in the first user account. The invoking module is further configured to invoke preset animation information corresponding to the preset operation instruction in response to the first electronic device detecting that the preset operation instruction reaches the preset condition.

According to the third aspect, in a fifth possible implementation, the live streaming interactive apparatus is a first electronic device, and the first electronic device is an electronic device that logs in the first user account. The electronic device further includes a sending module, configured to send the preset animation information to a second electronic device. The first electronic device and the second electronic device are electronic devices in the current live streaming room.

According to a fourth aspect of the disclosure, there is provided a live streaming interactive apparatus, including a receiving module, configured to receive a preset operation instruction sent by a second electronic device. The preset operation instruction is used to express emotions to a first user corresponding to a first user account, and the first user account is a user account with preset permissions in a current live streaming room. The apparatus includes a sending module, configured to send a first instruction to a target electronic device in the current live streaming room in response to detecting that the preset operation instruction reaches a preset condition. The first instruction is used to indicate that the preset operation instruction reaches the preset condition. The target electronic device includes at least one of: the second electronic device, a first electronic device that logs in the first user account.

According to the fourth aspect, in a first possible implementation, the live streaming interactive apparatus further includes an extracting module, configured to extract N target virtual resources corresponding to the preset operation instruction from the first user account in response to the preset operation instruction reaching the preset condition. N is a preset value and is a positive integer. The apparatus includes a determining module, configured to determine information of a virtual red envelope according to the target virtual resource. The sending module is further configured to send a second instruction to the target electronic device. The second instruction carries information of a virtual red envelope.

According to a fifth aspect of implementations of the disclosure, there is provided an electronic device including a processor and a memory for storing instructions executable by the processor. The processor is configured to execute the instructions to implement the live streaming interactive method according to the first aspect.

According to a sixth aspect of implementations of the disclosure, there is provided a server including a processor and a memory for storing instructions executable by the processor. The processor is configured to execute the instructions to implement the live streaming interactive method according to the second aspect.

According to a seventh aspect of implementations of the disclosure, there is provided a storage medium. Instructions in the storage medium, when executed by a processor of a live streaming interactive apparatus, enables the live streaming interactive apparatus to execute the live streaming interactive method according to the first aspect or the second aspect.

According to an eighth aspect of implementations of the disclosure, there is provided a computer program product, which can be directly loaded into an internal memory of a computer and contains software codes. The computer program can be loaded and executed by the computer to implement the live streaming interactive method according to the first aspect or the second aspect.

The technical solution provided by the implementations of the disclosure brings at least the following beneficial effects: in response to a preset operation instruction used to express emotions to a first user (i.e., an account user with preset permissions for the current live streaming room) corresponding to a first user account reaching a preset condition, the electronic device may invoke preset animation information corresponding to the preset operation instruction and render the preset animation information, so as to display the rendered preset animation on the current live streaming interface, which reminds users in the live streaming room that the host user in the current live streaming room has fulfilled his/her wishes, which improves the flexibility of live video streaming and the richness of functions of the live video streaming.

It should be noted that the above general description and the following detailed description are merely example and explanatory and should not be construed as limiting of the disclosure.

BRIEF DESCRIPTION OF THE DRAWINGS

The drawings herein are incorporated into the specification and constitute a part of the specification, show implementations conforming to the disclosure, and together with the specification are used to explain the principle of the disclosure, and do not constitute an improper limitation of the disclosure.

FIG. 1 is an architecture diagram showing a possible implementation environment according to an example implementation;

FIG. 1a shows step S11a included in step S11 shown in FIG. 1;

FIG. 1b shows a method flowchart of a live streaming interactive method according to an example implementation;

DETAILED DESCRIPTION

Figure 1C:
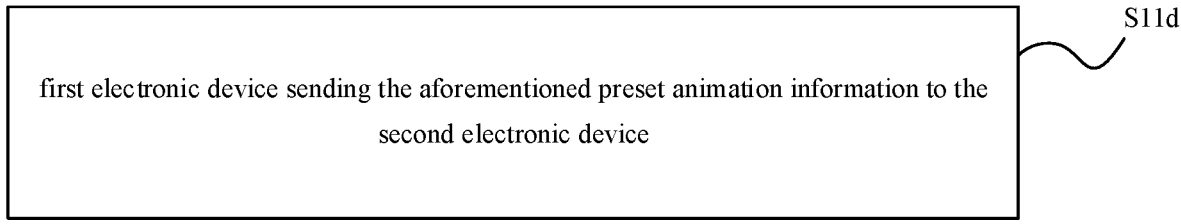
FIG. 1c shows step S11d after performing step S11 shown in FIG. 1.

In order to enable those of ordinary skill in the art to better understand the technical solutions of the disclosure, the technical solutions in the implementations of the disclosure will be described clearly and completely with reference to the accompanying drawings.

It should be noted that in the implementations of the disclosure, words such as "example" or "for example" are used as examples, exemplifications, or illustrations. Any implementation or design solution described as "example" or "for example" in the implementations of the disclosure should not be construed as being more preferable or advantageous than other implementations or design solutions. To be precise, words such as "example" or "for example" are used to present related concepts in a specific manner.

It should be noted that the terms "first" and "second" in the specification and claims of the disclosure and the above-mentioned drawings are used to distinguish similar objects, and not necessarily used to describe a specific order or sequence. It should be understood that the data used in this way can be interchanged under appropriate circumstances, so that the implementations of the disclosure described herein can be implemented in an order other than that illustrated or described herein. The implementations described in the following example implementations do not represent all implementations consistent with the disclosure. Rather, they are only examples of apparatuses and methods consistent with some aspects of the disclosure as detailed in the appended claims.

Before describing in detail the method for determining a virtual item record provided by the implementations of the disclosure, here is a brief introduction to the application scenarios and implementation environments involved in the implementations of the disclosure.

1) A brief introduction to the application scenarios involved in the implementations of the disclosure At present, the live video streaming platform provides rich interactive manners for host users and viewer users. For example, a virtual item record setting function is set up for the host user. The host user can set the virtual item record according to his/her own needs, and display the virtual item record during the live streaming through the adopted client device. In this way, viewer users who watch the live streaming of the host user can help the host user fulfill his/her wishes by presenting virtual items. During the live streaming process, the live streaming platform counts each virtual item in the virtual item record separately, and in response to the count of any virtual gift reaching the value set by the host user, it is determined that the live streaming wish corresponding to the virtual gift has been achieved. However, since the live streaming platform only counts virtual items, the viewers who watch the live streaming cannot be informed that the host user's wish is achieved in time, resulting in poor interactivity in the entire live streaming and the function of the live streaming is simple.

To this end, the implementations of the disclosure provide a live streaming interactive method. In this method, in response to a preset operation instruction used to express emotions to a first user (i.e., an account user with preset permissions for the current live streaming room) corresponding to a first user account reaching a preset condition, the electronic device may invoke preset animation information corresponding to the preset operation instruction and render the preset animation information, so as to display the rendered preset animation on the current live streaming interface, which reminds users in the live streaming room that the host user in the current live streaming room has fulfilled his/her wishes, which improves the flexibility of live video streaming and the richness of functions of the live video streaming. For specific implementation, please refer to the implementation shown in FIG. 2 below.

2) A brief introduction to the implementation environment involved in the implementations of the disclosure FIG. 1 is an architecture diagram according to a possible implementation environment. As shown in FIG. 1, the following text rendering method can be applied to the implementation environment. The implementation environment includes an electronic device 01 and a server 02. The electronic device 01 and the server 02 can be interconnected and communicated via a network. The aforementioned electronic device 01 may include a first electronic device and at least one second electronic device. It should be noted that FIG. 1 is only an example, and the number of electronic devices in practical applications can be set according to actual requirements.

In some examples, the above first electronic device may be an electronic device used by a host user, and the above second electronic device may be an electronic device used by a viewer user. The above first electronic device is an electronic device that logs in a first user account; the above first user account may be a user account with preset permissions in a current live streaming room corresponding to the current live streaming interface. Generally, the above first user account is an account of the host user. In some implementations of the disclosure, the host user can use the first electronic device to log in the live video streaming platform to perform the live video streaming, and the viewer user can use the second electronic device to log in the live video streaming platform to watch the live video streaming.

In some examples, the above first electronic device may be configured with a camera device or connected to the camera device to perform live video streaming through the camera device.

In some implementations, the above electronic device 01 may be any electronic product that can interact with the user through one or more manners such as a keyboard, a touch pad, a touch screen, a remote control, voice interaction or a handwriting device. For example, the electronic device 01 is a mobile phone, tablet computer, handheld computer, personal computer (PC), wearable device, smart TV, or the like.

In some implementations, the above server 02 is mainly used to implement the live streaming interactive method provided by the implementations of the disclosure. Further, the above server 02 is used to manage the live video streaming, for example, to manage live streaming interactive data between the host user and the viewer user. In some implementations, the aforementioned server 02 may be a server, a server cluster composed of a plurality of servers, or a cloud computing service center.

Those skilled in the art should understand that the above electronic devices and servers are only examples, and other existing or future electronic devices or servers that are applicable to the disclosure should also be included in the scope of protection of the disclosure, and are included herein by reference.

The execution subject of the live streaming interactive method provided in the implementations of the disclosure may be a live streaming interactive apparatus, or may be a functional module and/or functional entity in the live streaming interactive apparatus that can implement the live streaming interactive method, which may be determined according to actual usage requirements and will not be limited by implementations of the disclosure.

The live streaming interactive apparatus in implementations of the disclosure may be an electronic device, and the electronic device may be a mobile terminal device or a non-mobile terminal device. In some implementations, the mobile terminal device may be a mobile phone, a tablet computer, a notebook computer, a handheld computer, a vehicle-mounted terminal, a wearable device, an ultra-mobile personal computer, a netbook, or a personal digital assistant, etc., and a non-mobile terminal device may be a personal computer, a television, etc., and the implementations of the disclosure do not make specific limitations.

The technical solutions provided by the disclosure will be introduced below in conjunction with the drawings.

Figure 2:
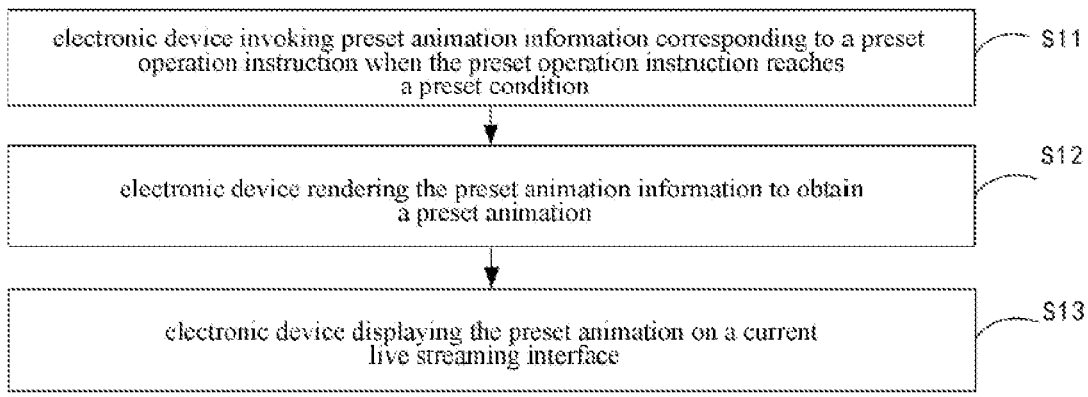
FIG. 2 is a method flowchart of a live streaming interactive method according to an example implementation.

FIG. 2 is a flow chart showing a live streaming interactive method according to an example implementation. As shown in FIG. 2, the live streaming interactive method includes following steps.

In S11, an electronic device invokes preset animation information corresponding to a preset operation instruction in response to the preset operation instruction reaching a preset condition.

In implementations of the disclosure, the foregoing preset operation instruction is used to express emotions to the first user corresponding to the first user account. The aforementioned first user account is a user account with preset permissions in the current live streaming room corresponding to the current live streaming interface. It can be understood that the aforementioned first user account may be the user account of the host user in the current live streaming room.

In S12, the electronic device renders the preset animation information to obtain a preset animation.

In S13, the electronic device displays the preset animation on a current live streaming interface.

It should be noted that the aforementioned electronic device may be an electronic device corresponding to the host user (that is, the first user), that is, the first electronic device (may be called the host client device) that logs in the first user account; or may also be the second electronic device (may be called the viewer client device) corresponding to the viewer user, which is not limited in implementations of the disclosure. The first electronic device and the second electronic device are electronic devices in the current live streaming room.

In implementations of the disclosure, the foregoing preset operation instruction may be an instruction triggered by the first electronic device or the second electronic device to perform the preset operation.

In implementations of the disclosure, the foregoing preset operation may be an operation in which the second user account expresses emotions to the first user corresponding to the first user account. In some implementations, the foregoing preset operation includes: an operation that the second user account presents the target virtual item to the first user account, or the preset operation performed by the second user account in the current live streaming room (for example, an operation that the second user account follows the first user account), or the operation that the second user account sends target information in the current live streaming room, or the like. It should be noted that the emotions expressed by the second user account to the first user corresponding to the first user account may be various emotions such as love, dislike, and happiness, which are not limited in implementations of the disclosure.

In some implementations, the aforementioned second user account may be a viewer user account currently in the current live streaming room, and the aforementioned second user account may also be a user account that has previously entered the current live streaming room but has currently exited the current live streaming room (i.e., in response to the second user account being in the current live streaming room, the operation of expressing emotions to the first user corresponding to the first user account was triggered). It should be noted that the aforementioned second user account is a general concept, which refers to all user accounts that express emotions to the first user corresponding to the first user account in the current live streaming room. It can be understood that the aforementioned second user account may be one or more user accounts.

In some implementations, the foregoing target virtual item may be one virtual item or a plurality of virtual items. For example, the aforementioned virtual items may be virtual ships, virtual cars, virtual currencies, virtual roses, and the like.

In some implementations, the aforementioned target virtual item may be at least one of a preset virtual item set. The electronic device or server will store the virtual item information (e.g., the name, ID, etc. of the virtual item. The ID can be used to identify the virtual item) of each virtual item in the virtual item set. In this way, the electronic device or the server can determine whether the electronic device triggers the preset operation instruction based on the virtual item information of the target virtual item.

For example, the foregoing preset operation may be: the operation of the viewer user account (i.e., the foregoing second user account) presenting a virtual ship to the host user account (i.e., the foregoing first user account), or the operation of the viewer user account presenting a virtual car to the host user account, or the operation of the viewer user account sending a specific comment in the current live streaming room, or the operation of the viewer user corresponding to the viewer user account chatting with the host user corresponding to the host user account.

In the implementations of the disclosure, the foregoing preset condition may be considered as the wish and hobbies of the host user (that is, the foregoing first user). In response to the preset operation instruction meeting the preset condition, it may be considered that the wish and hobbies corresponding to the preset condition are completed. In some implementations, the above-mentioned preset conditions may be considered as the wish list of the host user. In other words, the wish list of the host user can be a gift counting rule. In response to the server or electronic device determining that a certain wish is fulfilled, the electronic device can invoke the preset animation information to express that the host's wish is fulfilled by displaying the preset animation on the front end.

In implementations of the disclosure, the above-mentioned preset condition may be preset by a first user account that has the control permissions of the current live streaming room. In some implementations, taking the foregoing preset operation as the operation of presenting a target virtual item to the first user account by the second user account as an example, the first user account may set the preset condition corresponding to the preset operation in advance as: the number of the foregoing presented target virtual items has reached a predetermined threshold, for example, the number of virtual roses presented by viewer users reaches 99.

In implementations of the disclosure, the preset conditions corresponding to different preset operation instructions may be the same.

In some implementations, the preset operation instructions of the same type (for example, all the preset operations are operations of presenting virtual items to the host user account by the viewer user account), and the corresponding preset conditions may be the same. For example, the host user can set two wishes, which are the number of virtual roses presented by the viewer user reaching 99, and the number of loving hearts presented by the viewer user reaching 99, respectively. That is, as for the operation instruction for the viewer user to present the virtual rose and the operation instruction for the viewer user to present the loving heart, both the corresponding preset conditions are that the gift quantity reaches 99.

In the implementations of the disclosure, preset conditions corresponding to different preset operating instructions are different.

In an example, as for preset operation instructions of different types, the corresponding preset conditions may be different. For example, the host user can set two wishes, which are the number of virtual roses presented by the viewer user reaching 99, and the number of users who follow the host user account reaching 50 in this live streaming, respectively. That is, as for the operation instruction of the viewer user presenting virtual roses, the corresponding preset condition is that the number of presented virtual roses reaches 99. As for the operation instruction of following the host user account in this live streaming, the corresponding preset condition is that the number of followers reaches 50.

In another example, as for preset operation instructions of the same type, the corresponding preset conditions may also be different. For example, all the preset operations are operations of presenting virtual items to the host user account by the viewer user account, and the preset conditions corresponding to different virtual items (such as the number of gifts meeting the preset number threshold) are different. For example, the number threshold corresponding to the virtual ship is 2, the number threshold corresponding to the virtual car is 3, the number threshold corresponding to the virtual currency is 100, and the number threshold corresponding to the virtual rose is 500 and so on. It should be noted that the above-mentioned number threshold may be flexibly set by the user according to actual needs, or may be set by the server by default, which is not limited in implementations of the disclosure.

In implementations of the disclosure, during the live streaming of the first user, the server or the electronic device may acquire the live streaming interactive data corresponding to the current live streaming room in response to it detecting that the first user account is logged into the live streaming platform. In other words, the server or the electronic device can collect the live streaming interactive data corresponding to the current live streaming room in response to it detecting that the first user account is performing the live streaming. In this way, the electronic device can determine that the preset operation instruction reaches the preset condition based on the live streaming interactive data. Further, the server stores the collected live streaming interactive data in a way corresponding to the first user account.

In some implementations, the aforementioned live streaming interactive data may include: interactive data between the host user and the host user, or the interactive data between the host user and the viewer user, or interactive data among a plurality of viewer users who watch the live streaming of the same host user. In a possible example, the above-mentioned live streaming interactive data may include chatting records of the live streaming, records of presenting gifts of the live streaming, or the like. The above-mentioned chatting information of live streaming may include voice chatting information, text chatting information, etc., which is not limited in implementations of the disclosure. In a possible example, the above-mentioned interaction between the host user and the viewer user may include that: the viewer user may present virtual items to the host user, the viewer user chats with the host user, etc., for example, "the viewer user A presents you a bunch of virtual rose".

In implementations of the disclosure, the aforementioned preset animation information includes one or more pieces of animation information, and the aforementioned one or more pieces of animation information may be rendered to form one or more preset animations. In some implementations of the disclosure, one piece of animation information is rendered to form one preset animation, or one piece of animation information is rendered to form a plurality of preset animations, or a plurality of pieces of animation information are rendered to form one preset animation, or a plurality of pieces of animation information are rendered to form a plurality of preset animations. In addition, in response to a plurality of preset animations being formed, the electronic device may display the plurality of preset animations in a predetermined display manner, e.g., displaying sequentially in a predetermined display order.

In implementations of the disclosure, the above-mentioned preset animation may be a flat animation, a 3D animation, or a virtual reality AR animation, which is not limited in implementations of the disclosure.

In implementations of the disclosure, the above-mentioned preset animation information includes at least one of: animation picture information, a storage location of the animation picture information, a display position in a live streaming picture, and so on.

In the implementations of the disclosure, the preset animation information corresponding to different preset operation instructions may be the same or different. It may be understood that the wish list of the first user usually includes one or more wishes. The animation rendering effect of the wish fulfillment will be triggered in response to each wish being fulfilled. At this time, the animation rendering effect can be unified, that is, the same set of animations will be rendered in response to each wish being fulfilled, or the animation rendering effect can be different, that is, different animations will be rendered in response to different wishes are fulfilled. In some implementations, taking the above preset operation as the operation of presenting the target virtual items to the first user account by the second user account as an example, the first user may set the expected quantity of the plurality of virtual items. In response to the quantity of each virtual item reaching a predetermined threshold, a corresponding display effect will be triggered on the client device, to prompt the corresponding user at the client device that the virtual item reaches the expected quantity.

In implementations of the disclosure, different preset operation instructions correspond to different preset animation information. For example, the operation instruction of the viewer user presenting a rose to the host user corresponds to the animation information of "rose", and the operation instruction of the viewer user presenting a car to the host user corresponds to the animation information of "car".

In implementations of the disclosure, different preset operation instructions correspond to the same preset animation information. For example, both the operation instruction of the viewer user presenting a rose to the host user and the operation instruction of the viewer user presenting a car to the host user correspond to the animation information of "fireworks".

In implementations of the disclosure, at least one corresponding relationship is pre-stored in the electronic device or the server, and each corresponding relationship in the at least one corresponding relationship is a corresponding relationship between an operation instruction and at least one piece of animation information. The at least one corresponding relationship includes the corresponding relationship between the preset operation instruction and the preset animation information described above. It should be noted that one preset operation instruction corresponds to one or more pieces of animation information.

In some implementations, if the corresponding relationship between the preset operation instruction and the preset animation information is pre-stored in the electronic device, in response to the preset operation instruction reaching the preset condition, the electronic device can acquire the preset animation information corresponding to the preset operation instruction based on the pre-stored corresponding relationship, and then render the preset animation information to obtain the preset animation, and display the preset animation in the current live streaming room.

In some implementations, if the corresponding relationship between the preset operation instruction and the preset animation information is pre-stored in the server, in response to the preset operation instruction reaching the preset condition, the electronic device may send an instruction to the server, to instruct the server to feed back the preset animation information corresponding to the preset operation instruction to the electronic device based on the pre-stored corresponding relationship, so that the electronic device can render the preset animation information to obtain the preset animation, and display the preset animation in the current live streaming room.

In implementations of the disclosure, the process of determining whether the preset operation instruction reaches the preset condition may be executed by the electronic device side or the server side, which is not limited in implementations of the disclosure.

In implementations of the disclosure, in response to the above-mentioned electronic device being a first electronic device, and the above-mentioned first electronic device is an electronic device that logs in the first user account, i.e., for the process of the first electronic device determining whether the preset operation instruction reaches the preset condition, the above S11 may include the following S11a, as shown in FIG. 1a.

In S11a, preset animation information corresponding to the preset operation instruction is invoked in response to the first electronic device detecting that the preset operation instruction reaches the preset condition.

In some implementations, after any second user account executes the preset operation corresponding to the preset operation instruction, the second electronic device corresponding to the any second user account will trigger the preset operation instruction. At this time, the second electronic device may send the preset operation instruction to the first electronic device, and preset animation information corresponding to the preset operation instruction is invoked in response to the first electronic device detecting that the preset operation instruction reaches the preset condition.

In implementations of the disclosure, for the process in which the server determines whether the preset operation instruction reaches the preset condition, the live streaming interactive method provided by the implementation of the disclosure further includes following S11b1 and S11b2, as shown in FIG. 1b.

In S11b1, the electronic device receives the first instruction sent by the server.

In implementations of the disclosure, the above-mentioned first instruction is used to indicate that the preset operation instruction reaches the preset condition.

Further, in combination with the above S11b1, the above S11 may include the following S11b2.

In S11b2, the electronic device invokes the preset animation information corresponding to the preset operation instruction according to the first instruction.

In some implementations, after any second user account executes the preset operation corresponding to the preset operation instruction, the second electronic device corresponding to the any second user account will trigger the preset operation instruction. At this time, the second electronic device can report the preset operation instruction to the server. In response to the server detecting that the preset operation instruction reaches the preset condition, it will send the first instruction (that is, a wish fulfillment instruction) to the target electronic device (that is, the first electronic device or a part or all of the second electronic devices), to instruct the electronic device to invoke the preset animation information corresponding to the aforementioned preset operation instruction. The first electronic device and the second electronic device are electronic devices in the current live streaming room.

In an implementation of the disclosure, in response to the above-mentioned electronic device being a first electronic device, and the above-mentioned first electronic device is an electronic device that logs in the first user account, after the above S11, the live streaming interactive method provided by the implementations of the disclosure may also include the following S11d, as shown in FIG. 1c.

In S11d, the first electronic device sends the aforementioned preset animation information to the second electronic device.

The first electronic device and the second electronic device are electronic devices in the current live streaming room.

In some implementations, after the first electronic device invokes the preset animation information corresponding to the preset operation instruction in response to the preset operation instruction reaching the preset condition, the first electronic device will send the preset animation information to a part or all of the second electronic devices in the current live streaming room, so that after acquiring the preset animation information, these second electronic devices can render the preset animation information to obtain the preset animation, and then display the preset animation in the current live streaming interface currently displayed by the second electronic device, so that the viewer users corresponding to the second electronic devices can quickly and intuitively check that the host user in the current live streaming room has reached his/her wish.

The live streaming interactive method provided by the implementations of the disclosure brings at least the following beneficial effects: in response to a preset operation instruction used to express emotions to a first user (i.e., an account user with preset permissions for the current live streaming room) corresponding to a first user account reaching a preset condition, the electronic device may invoke preset animation information corresponding to the preset operation instruction and render the preset animation information, so as to display the rendered preset animation on the current live streaming interface, which reminds users in the live streaming room that the host user in the current live streaming room has fulfilled his/her wishes, which improves the flexibility of live video streaming and the richness of functions of the live video streaming.

Under normal circumstances, each wish on the wish list of the host user has a certain value. In response to the wish of the host being fulfilled, the electronic device or server will trigger the wish red envelope logic and randomly mark off a certain proportion (e.g., 10%) from all the virtual resources of the wish to generate virtual red envelopes and distribute them to the electronic device of the viewer user.

Figure 3:
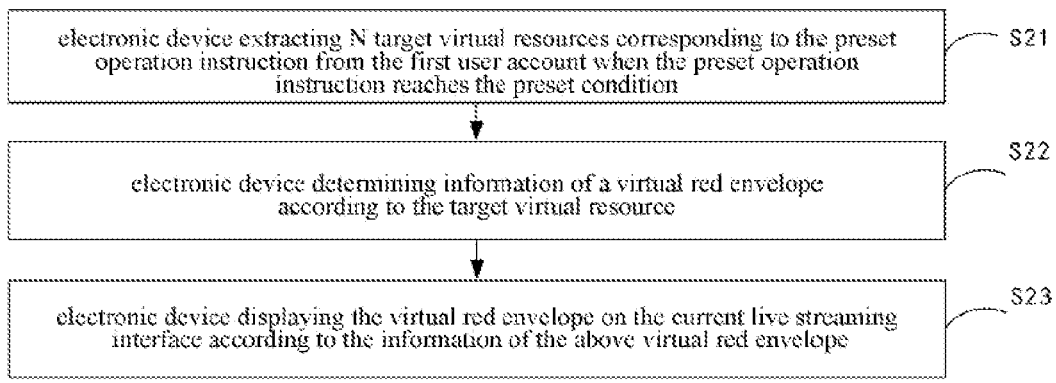
FIG. 3 is another method flowchart of a live streaming interactive method according to an example implementation.

In some implementations, the electronic device triggers and executes the wish red envelope logic for the execution subject. As shown in FIG. 3, a flow chart of a live streaming interactive method according to an example implementation is shown. The live streaming interactive method may include following S21 to S23.

In S21, the electronic device extracts N target virtual resources corresponding to the preset operation instruction from the first user account in response to the preset operation instruction reaching the preset condition.

In the implementation, the aforementioned N is a preset value, and the aforementioned N is a positive integer.

In S22, the electronic device determines information of a virtual red envelope according to the target virtual resource.

In S23, the electronic device displays the virtual red envelope on the current live streaming interface according to the information of the above virtual red envelope.

In the implementations of the disclosure, the above-mentioned target virtual resources may be virtual items (for example, virtual coins, rechargeable batteries, avatars or game virtual equipment, etc.) or virtual funds (for example, electronic red envelopes or electronic vouchers, etc.) or multimedia resources (for example, movies, music, documents, pictures, etc.), which are not limited in implementations of the disclosure.

In implementations of the disclosure, the above-mentioned preset value N may be set by the user according to actual application scenarios, or may be the default number of the server, or may be a certain proportion (e.g., 10% to 20%) of virtual resources corresponding to the preset operation instruction, which is not limited in implementations of the disclosure.

In implementations of the disclosure, in response to the preset operation instruction reaching the preset condition (that is, the wish is fulfilled), the electronic device extracts a part of virtual resources from all the virtual resources corresponding to the preset operation instructions, and distributes them to the viewer users in the form of virtual red envelopes. In an example, since each wish on the wish list of the host user has a certain value, in response to the host user submitting the wish, the server or electronic device calculates the number of virtual resources (for example, virtual currency value of the virtual item corresponding to the wish*the number of virtual gifts) corresponding to each wish. In this way, in response to a wish being fulfilled, the electronic device will randomly mark off a certain proportion (e.g., 10%) from all the virtual resources of the wish to generate virtual red envelopes and distribute them to the electronic device of the viewer user.

In implementations of the disclosure, the above-mentioned generated virtual red envelope may be one or more, and may be a fixed virtual red envelope or a fixed number of random virtual red envelopes, which is not limited in implementations of the disclosure.

In implementations of the disclosure, the above-mentioned virtual red envelope information may include at least one of the following: the total number of virtual resources of the virtual red envelopes, the number of virtual red envelopes to be allocated, and the number of virtual resources correspondingly allocated to each virtual red envelope. For example, taking the virtual resources as virtual coins as an example, the total currency value extracted by the server is 100 yuan, the default number of virtual red envelopes to be allocated is 10, and the allocated amount of virtual red envelopes is evenly distributed, then the 100 yuan will be evenly distributed into 10 shares, each share with 10 yuan.

In implementations of the disclosure, the electronic device displays the virtual red envelope on the current live streaming interface. The virtual red envelope can be displayed by generating an identification of the virtual red envelope in the current live streaming interface. In this way, the viewer user can click the identification of the virtual red envelope to receive the virtual resources contained in the virtual red envelope. In some implementations, the identification of the aforementioned virtual red envelope may be a control of the virtual red envelope, or an icon of the virtual red envelope, or other identifications that can indicate the virtual red envelope, which is not limited in implementations of the disclosure.

In addition, the electronic device can also generate a virtual red envelope in response to the total number of all virtual items on the wish list in the live streaming room reaching a certain number.

Figure 4:
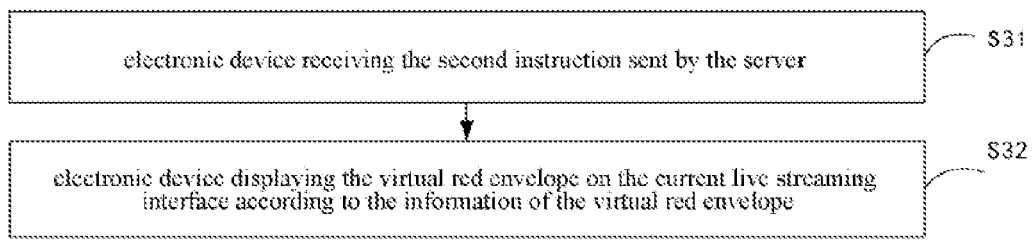
FIG. 4 is yet another method flowchart of a live streaming interactive method according to an example implementation.

In other implementations, the server triggers and executes the wish red envelope logic for the execution subject. As shown in FIG. 4, a flow chart of a live streaming interactive method according to an example implementation is shown. The live streaming interactive method may include following S31 and S32.

In S31, the electronic device receives the second instruction sent by the server.

In implementations of the disclosure, the above-mentioned second instruction carries information of the virtual red envelope; the above-mentioned second instruction is an instruction generated in response to the above-mentioned preset operation instruction reaching a preset condition.

In S32, the electronic device displays the virtual red envelope on the current live streaming interface according to the information of the virtual red envelope.

In implementations of the disclosure, in response to the preset operation instruction reaching the preset condition (that is, the wish is fulfilled), the server extracts a part of virtual resources from all the virtual resources corresponding to the preset operation instructions, and distributes them to the viewer users through the electronic device in the form of virtual red envelopes.

It should be noted that since the information of the virtual red envelope in the implementation corresponding to FIG. 3 is the same as the information of the virtual red envelope in the implementation corresponding to FIG. 4, details are not described herein again in order to avoid repetition.

In implementations of the disclosure, the above-mentioned electronic device may be an electronic device that triggers the above-mentioned preset operation instruction in the current live streaming room, that is, the server may only send the second instruction (i.e. virtual red envelope instruction) to the electronic device that contributes to the wish list of the host user, and as for the electronic devices that do not trigger the above preset operation instruction in the current live streaming room, the server does not send the above second instruction to these electronic devices, and shields the virtual red envelopes from these electronic devices. It can be understood that the virtual red envelope sent by the host user is directional, and the virtual red envelope is shielded from viewer users who have no contribution to the wish list.

In this way, the implementations of the disclosure expand the scenarios of special effects and red envelopes based on the wish list counting rules, increase the interest and value of the wish list, and make the viewer users more willing to participate in the process of helping the host users reach the wish list, enriching functions of the live video streaming.

Figure 5:
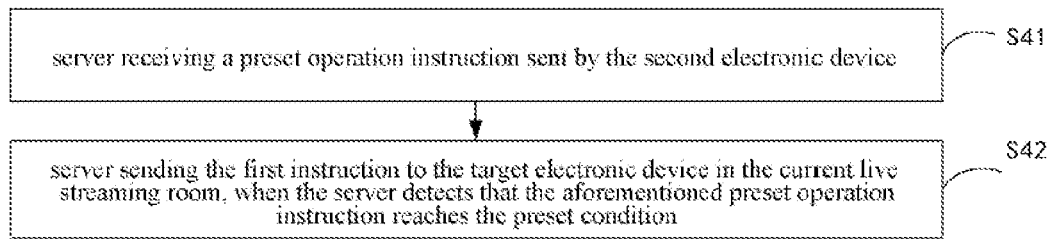
FIG. 5 is still yet another method flowchart of a live streaming interactive method according to an example implementation.

In other implementations, as shown in FIG. 5, a flow chart of a live streaming interactive method according to an example implementation is shown. For the process in which the server determines whether the preset operation instruction reaches the preset condition, the live streaming interactive method may include following S41 and S42.

In S41, the server receives a preset operation instruction sent by the second electronic device.

In S42, in response to the server detecting that the aforementioned preset operation instruction reaches the preset condition, the server sends the first instruction to the target electronic device in the current live streaming room.

In implementations of the disclosure, the above-mentioned first instruction is used to indicate that the preset operation instruction reaches the preset condition.

In implementations of the disclosure, the above-mentioned target electronic device includes at least one of: the second electronic device, a first electronic device that logs in the first user account. It can be understood that in response to the server detecting that the preset operation instruction reaches the preset condition (that is, the wish is fulfilled), the server may send the first instruction to the client electronic device (i.e., the second electronic device) of the viewer user, to inform the second electronic device that the preset operation instruction reaches the preset condition, and the server may also send the first instruction to the client electronic device (i.e., the first electronic device) of the host user, to inform the first electronic device that the preset operation instruction reaches the preset condition.

In implementations of the disclosure, in response to the server detecting that the preset operation instruction reaches the preset condition, that is, in response to the server determining that the wish is fulfilled, it will send a wish fulfillment instruction (that is, the above-mentioned first instruction) to the client device (that is, the first electronic device and/or the second electronic device) through a signaling, to notify the client device to process and display the wish fulfillment effect. At this time, the client device will perform the local rendering of the preset animation information according to the wish fulfillment instruction, and display the rendering result on the current live streaming interface.

The live streaming interactive method provided by the implementations of the disclosure brings at least the following beneficial effects: after the server receives preset operation instructions that express emotions to the first user (that is, the account user with preset permissions to the current live streaming room) corresponding to the first user account sent by the second electronic device, by detecting the preset operation instruction, in response to detecting that the preset operation instruction reaches the predetermined condition, the server sends the first instruction to the target electronic device, which instructs the target electronic device that the preset animation information corresponding to the preset operation instruction can be invoked, and the preset animation information can be rendered, so as to display the rendered preset animation on the current live streaming interface, and then remind users in the live streaming room that the host user in the current live streaming room has fulfilled his/her wishes, which improves the flexibility of live video streaming and the richness of functions of the live video streaming.

Figure 5A:
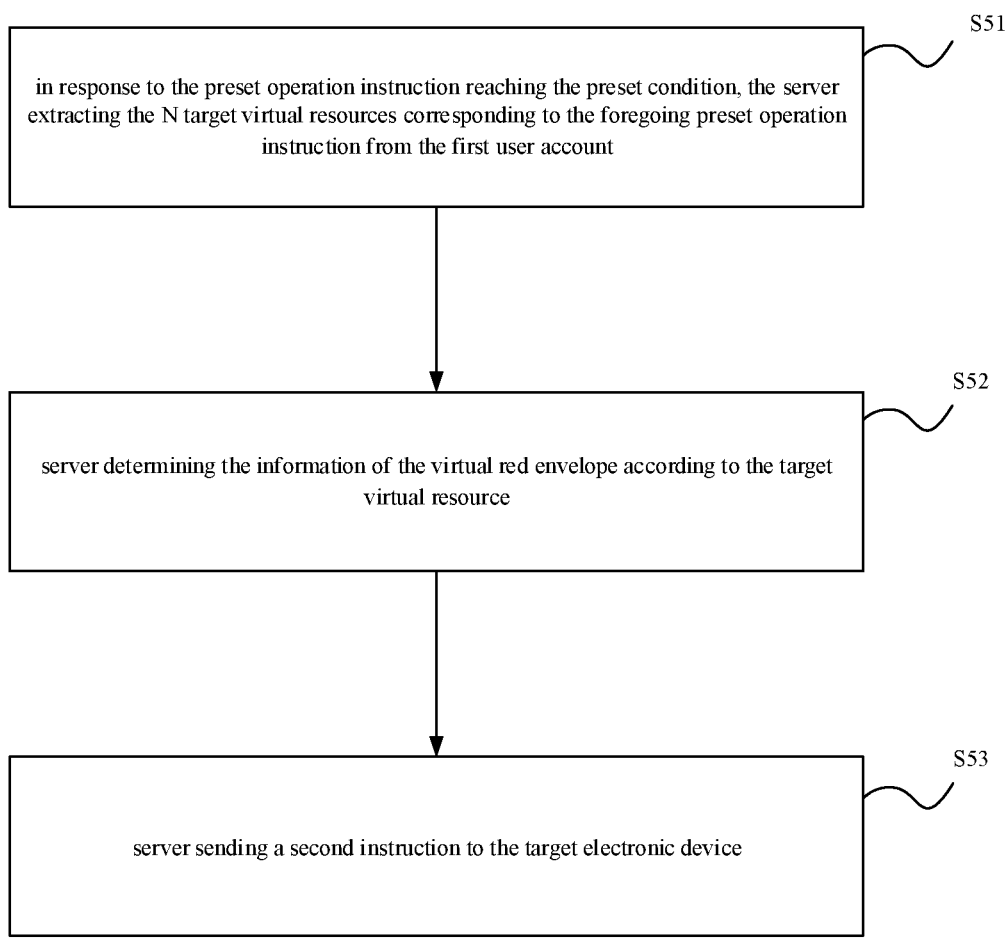
FIG. 5a is still yet another method flowchart of a live streaming interactive method according to an example implementation.

In implementations of the disclosure, in combination with the foregoing implementation, the live streaming interactive method provided in implementations of the disclosure may further include following S51 to S53, as shown in FIG. 5a.

In S51, in response to the preset operation instruction reaching the preset condition, the server extracts the N target virtual resources corresponding to the foregoing preset operation instruction from the first user account.

In S52, the server determines the information of the virtual red envelope according to the target virtual resource.

In S53, the server sends a second instruction to the target electronic device.

The above-mentioned second instruction carries the information of the above-mentioned virtual red envelope.

It should be noted that since the logic of the wish red envelope in the implementation corresponding to FIG. 3 may be the same as the logic of the wish red envelope in the implementation corresponding to FIG. 5, the description of the wish red envelope will not be repeated herein.

In this way, the implementations of the disclosure expand the scenarios of special effects and red envelopes based on the wish list counting rules, increase the interest and value of the wish list, and make the viewer users more willing to participate in the process of helping the host users reach the wish list, enriching functions of the live video streaming.

Figure 6:
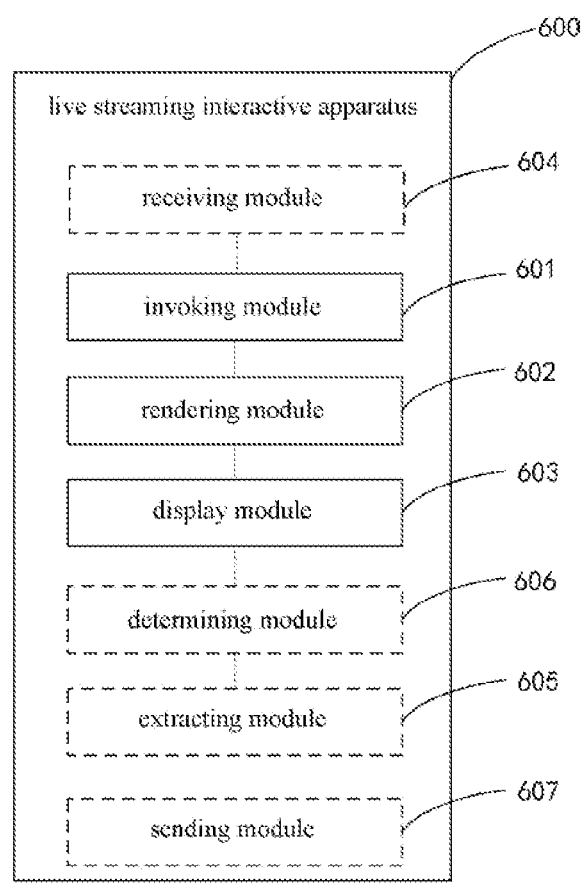
FIG. 6 is a structural block diagrams of a live streaming interactive apparatus according to an example implementation.

FIG. 6 is a block diagram showing a live streaming interactive apparatus according to an example implementation. Referring to FIG. 6, the live streaming interactive apparatus 600 includes an invoking module 601, a rendering module 602, and a display module 603.

The invoking module 601 is configured to invoke preset animation information corresponding to a preset operation instruction in response to the preset operation instruction reaching a preset condition; the rendering module 602 is configured to render the preset animation information invoked by the invoking module 601 to obtain a preset animation; the display module 603 is configured to display the preset animation obtained by the rendering module 602 on a current live streaming interface. The preset operation instruction is used to express emotions to a first user corresponding to a first user account, and the first user account is a user account with preset permissions in a current live streaming room corresponding to the current live streaming interface.

In some implementations of the disclosure, as shown in FIG. 6, the above-mentioned live streaming interactive apparatus 600 further includes a receiving module 604 configured to receive a first instruction sent by a server. The first instruction is used to indicate that the preset operation instruction reaches the preset condition. The invoking module 601 is further configured to invoke preset animation information corresponding to the preset operation instruction according to the first instruction received by the receiving module 604.

In some implementations of the disclosure, as shown in FIG. 6, the above-mentioned live streaming interactive apparatus 600 further includes an extracting module 605 and a determining module 606. The extracting module 605 is configured to extract N target virtual resources corresponding to the preset operation instruction from the first user account in response to the preset operation instruction reaching the preset condition. N is a preset value and is a positive integer. The determining module 606 is configured to determine information of a virtual red envelope according to the target virtual resource extracted by the extracting module 605. The display module 603 is further configured to display the virtual red envelope on the current live streaming interface according to the information of the virtual red envelope determined by the determining module 606.

In some implementations of the disclosure, the receiving module 604 is further configured to receive a second instruction sent by a server. The second instruction carries information of a virtual red envelope, and the second instruction is an instruction generated in response to the preset operation instruction reaching the preset condition. The display module 603 is further configured to display the virtual red envelope on the current live streaming interface according to the information of the virtual red envelope.

In some implementations of the disclosure, the above-mentioned live streaming interactive apparatus 600 is a first electronic device, and the first electronic device is an electronic device that logs in the first user account. The invoking module 601 is further configured to invoke preset animation information corresponding to the preset operation instruction in response to the first electronic device detecting that the preset operation instruction reaches the preset condition.

In some implementations of the disclosure, the aforementioned live streaming interactive apparatus 600 is a first electronic device, and the first electronic device is an electronic device that logs in the first user account. As shown in FIG. 6, the live streaming interactive apparatus 600 further includes: a sending module 607. The sending module 607 is configured to send the preset animation information to a second electronic device. The first electronic device and the second electronic device are electronic devices in the current live streaming room.

The live streaming interactive apparatus provided by the implementation of the disclosure brings at least the following beneficial effects: in response to a preset operation instruction used to express emotions to a first user (i.e., an account user with preset permissions for the current live streaming room) corresponding to a first user account reaching a preset condition, the electronic device may invoke preset animation information corresponding to the preset operation instruction and render the preset animation information, so as to display the rendered preset animation on the current live streaming interface, which reminds users in the live streaming room that the host user in the current live streaming room has fulfilled his/her wishes, which improves the flexibility of live video streaming and the richness of functions of the live video streaming.

Regarding the apparatus in the foregoing implementation, the specific manner in which each module performs operation has been described in detail in the implementation of the method, and detailed description will not be given herein.

It should be noted that, as shown in FIG. 6, the modules that must be included in the live streaming interactive apparatus 600 are indicated by solid line frames, such as the invoking module 601; the modules that may or may not be included in the live streaming interactive apparatus 600 are indicated by dashed frames, such as the receiving module 604.

Figure 7:
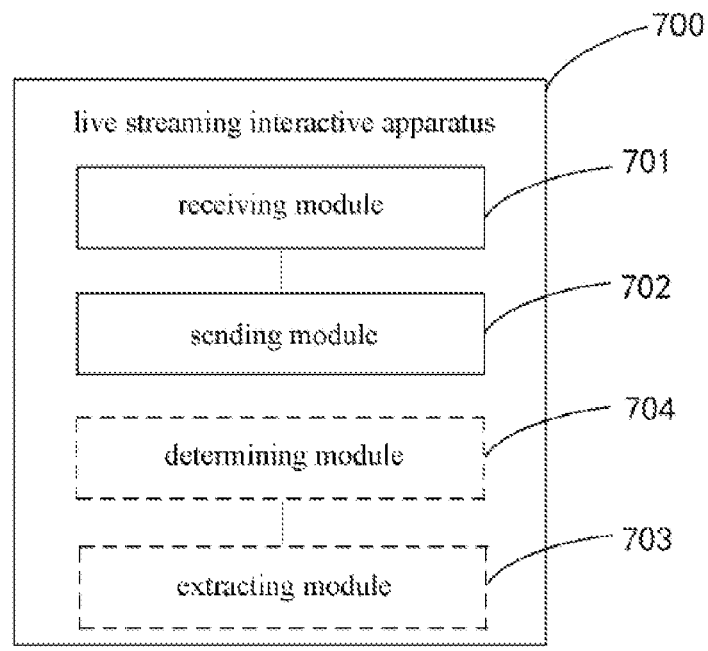
FIG. 7 is another structural block diagram showing a live streaming interactive apparatus according to an example implementation.

FIG. 7 is a block diagram showing a live streaming interactive apparatus according to an example implementation. Referring to FIG. 7, the live streaming interactive apparatus 700 includes: a receiving module 701 and a sending module 702.

The receiving module 701 is configured to receive a preset operation instruction sent by a second electronic device. The preset operation instruction is used to express emotions to a first user corresponding to a first user account, and the first user account is a user account with preset permissions in a current live streaming room; the sending module 702 is configured to send a first instruction to a target electronic device in the current live streaming room in response to detecting that the preset operation instruction reaches a preset condition. The first instruction is used to indicate that the preset operation instruction reaches the preset condition. The target electronic device includes at least one of: the second electronic device, a first electronic device that logs in the first user account.

In some implementations of the disclosure, as shown in FIG. 7, the above-mentioned live streaming interactive apparatus 700 further includes an extracting module 703 and a determining module 704. The extracting module 703 is configured to extract N target virtual resources corresponding to the preset operation instruction from the first user account in response to the preset operation instruction reaching the preset condition. N is a preset value and is a positive integer. The determining module 704 is configured to determine information of a virtual red envelope according to the target virtual resource. The sending module 702 is further configured to send a second instruction to the target electronic device. The second instruction carries information of a virtual red envelope.

The live streaming interactive apparatus provided by the implementations of the disclosure brings at least the following beneficial effects: after the server receives preset operation instructions that express emotions to the first user (that is, the account user with preset permissions to the current live streaming room) corresponding to the first user account sent by the second electronic device, by detecting the preset operation instruction, in response to detecting that the preset operation instruction reaches the predetermined condition, the server sends the first instruction to the target electronic device, which instructs the target electronic device that the preset animation information corresponding to the preset operation instruction can be invoked, and the preset animation information can be rendered, so as to display the rendered preset animation on the current live streaming interface, and then remind users in the live streaming room that the host user in the current live streaming room has fulfilled his/her wishes, which improves the flexibility of live video streaming and the richness of functions of the live video streaming.

Regarding the apparatus in the foregoing implementation, the specific manner in which each module performs operation has been described in detail in the implementation of the method, and detailed description will not be given herein.

It should be noted that, as shown in FIG. 7, the modules that must be included in the live streaming interactive apparatus 700 are indicated by solid line frames, such as the receiving module 701; the modules that may or may not be included in the live streaming interactive apparatus 700 are indicated by dashed frames, such as the extracting module 703.

Figure 8:
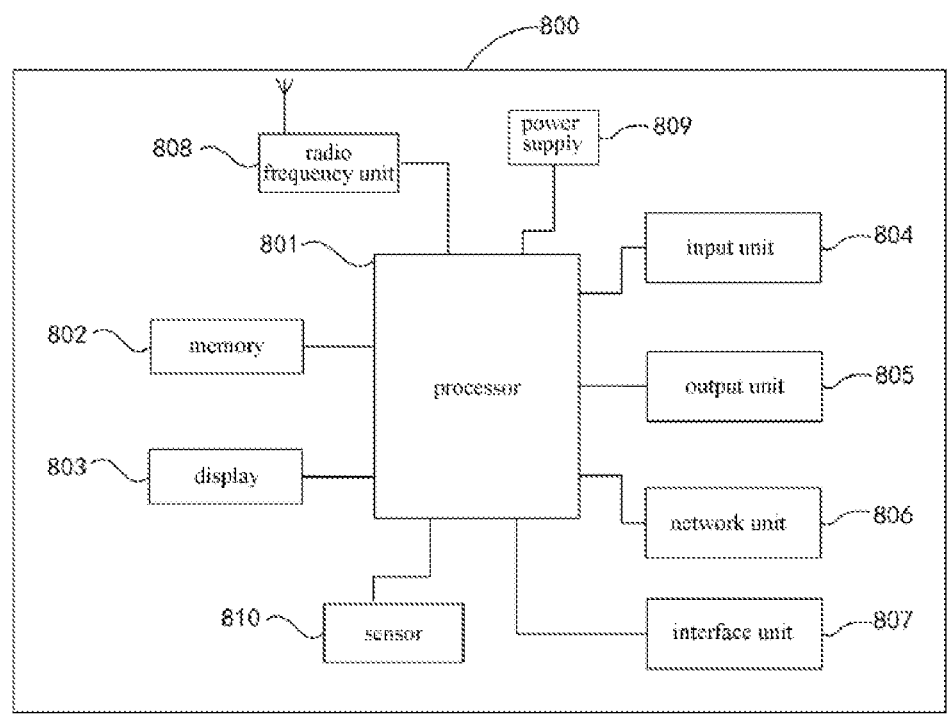
FIG. 8 is a block diagram showing a hardware structure of an electronic device according to an example implementation.

FIG. 8 is a block diagram showing an electronic device 800 for live streaming interaction according to an example implementation. The electronic device 800 includes, but is not limited to, a mobile phone, a tablet computer, a notebook computer, a palmtop computer, a vehicle-mounted terminal, a wearable device, and a pedometer. As shown in FIG. 8, the electronic device 800 includes but is not limited to: a processor 801, a memory 802, a display 803, an input unit 804, an output unit 805, a network unit 806, an interface unit 807, a radio frequency unit 808, a power supply 809, a sensor 810, or the like.

The aforementioned processor 801 is a memory used to store executable instructions of the processor. The aforementioned processor 801 is configured to execute the aforementioned instructions to implement the aforementioned method. It can be understood that the aforementioned processor 801 is configured to execute any step in the aforementioned implementation corresponding to FIG. 2 to FIG. 4, which will not be elaborated here.

It should be noted that those skilled in the art can understand that the structure of the electronic device shown in FIG. 8 does not constitute a limitation on the electronic device, and the electronic device may include more or less components than those shown in FIG. 8, or a combination of some components, or different component arrangements.

The processor 801 is the control center of the electronic device. It uses various interfaces and lines to connect various parts of the entire electronic device, runs or executes the software programs and/or modules stored in the memory 802, calls the data stored in the memory 802, performs various functions of electronic device and processes data, so as to monitor the electronic device as a whole. The processor 801 may include one or more processing units; in some implementations of the disclosure, the processor 801 may integrate an application processor and a modem processor, where the application processor mainly processes the operating system, user interface and application programs, etc., and the modem processor mainly deals with wireless communication. It can be understood that the foregoing modem processor may not be integrated into the processor 801.

The memory 802 can be used to store software programs and various data. The memory 802 may mainly include a program storage area and a data storage area. The program storage area may store an operating system, an application program required by at least one function (such as a sound playback function, an image playback function, etc.) or the like; the data storage area may store data (such as audio data, phone book, etc.) created by the use of mobile phones, or the like. In addition, the memory 802 may include a high-speed random access memory, and may also include a non-volatile memory, such as at least one magnetic disk storage device, a flash memory device, or other volatile solid-state storage devices.

The display 803 is used to display information input by the user or information provided to the user. The display 803 may include a display panel, and the display panel may be configured in the form of a liquid crystal display (LCD), an organic light-emitting diode (OLED) or the like.

The input unit 804 can be used to receive audio or video signals. The input unit 804 may include a graphics processing unit (GPU) and a microphone. The graphics processor processes image data of still pictures or videos obtained by an image capture device (such as a camera) in the video capture mode or the image capture mode. The processed image frame can be displayed on the display 808. The image frame processed by the graphics processor may be stored in the memory 802 (or other storage medium) or sent via the radio frequency unit 808 or the network unit 808. The microphone can receive sound and can process such sound into audio data. The processed audio data can be converted into a format that can be sent to the mobile communication base station via the radio frequency unit 808 for output in the case of a telephone call mode.

The input unit 804 can be a user input unit, which can be used to receive inputted numeric or character information and generate signal inputs related to user settings and function control of the electronic device. In some implementations of the disclosure, the user input unit includes a touch panel and other input devices. A touch panel, also called a touch screen, can collect user touch operations on or near it, for example, operations that the user uses fingers, stylus, or any other suitable objects or accessories to operate on or near the touch panel. The touch panel may include two parts: a touch detection device and a touch controller. The touch detection device detects the user's touch position, detects the signal brought by the touch operation, and transmits the signal to the touch controller; the touch controller receives the touch information from the touch detection device, converts it into contact coordinates, and then sends it to the processor 801, receives and executes the command sent by the processor 801. In addition, multiple types of resistive, capacitive, infrared, and surface acoustic waves can be used to implement touch panels. In addition to the touch panel, the user input unit may also include other input devices. In some implementations of the disclosure, other input devices may include, but are not limited to, a physical keyboard, a function keys (such as volume control button, switch button, etc.), trackball, mouse, and joystick, which will not be repeated here.

Further, the touch panel can be overlaid on the display panel. In response to the touch panel detecting a touch operation on or near it, it is sent to the processor 801 to determine the type of touch event, and then the processor 801 provides a corresponding visual output on the display panel according to the type of the touch event. The touch panel and the display panel 8081 can be used as two independent components to realize the input and output functions of the electronic device, or the touch panel and the display panel can be integrated to realize the input and output functions of the electronic device. The details are not limited herein.

The output unit 805 may be an audio output unit, and may convert the audio data received by the radio frequency unit 808 or the network unit 806 or stored in the memory 802 into audio signals and output them as sounds. Moreover, the audio output unit may also provide audio output related to a specific function performed by the electronic device 800 (for example, call signal reception sound, message reception sound, etc.). The audio output unit includes a speaker, a buzzer, and a receiver or the like.

The electronic device provides users with wireless broadband Internet access through the network unit 806, such as helping users to send and receive emails, browse web pages, and access streaming media or the like.

The interface unit 807 is an interface for connecting an external device and the electronic device 800. For example, the external device can include a wired or wireless headset port, an external power source (or battery charger) port, a wired or wireless data port, a memory card port, a port for connecting an apparatus with an identification module, audio input/output (I/O) port, video I/O port, headphone port, or the like. The interface unit 807 can be used to receive input (for example, data information, power, etc.) from an external device and transmit the received input to one or more elements in the electronic device 800 or can be used to transfer data between the electronic device 800 and the external device.

The radio frequency unit 808 can be used for receiving and sending signals during information transmission or communication. In some implementations of the disclosure, after receiving downlink data from the base station, it is processed by the processor 801; in addition, the uplink data is sent to the base station. Generally, the radio frequency unit 808 includes, but is not limited to, an antenna, at least one amplifier, a transceiver, a coupler, a low noise amplifier, a duplexer, and the like. In addition, the radio frequency unit 808 can also communicate with the network and other devices through a wireless communication system.

The power supply 809 (such as a battery) may be used to supply power to various components. In some implementations of the disclosure, the power supply 809 may be logically connected to the processor 801 through a power management system, so that functions such as charging, discharging, and power consumption management can be managed through the power management system.

The sensor 810 may include at least one of a light sensor, a motion sensor, and other sensors. In some implementations of the disclosure, the light sensor includes an ambient light sensor and a proximity sensor. The ambient light sensor can adjust the brightness of the display panel according to the brightness of the ambient light. The proximity sensor can close the display panel and/or backlight in response to the electronic device 800 moving to the ear. As a kind of motion sensor, the accelerometer sensor can detect the magnitude of acceleration in various directions (usually three-axis), and can detect the magnitude and direction of gravity when stationary, and can be used to identify the posture of electronic devices (such as horizontal and vertical screen switching, related games, magnetometer attitude calibration), vibration recognition related functions (such as pedometer, tap), etc.; the sensor 810 can also include fingerprint sensors, pressure sensors, iris sensors, molecular sensors, gyroscopes, barometers, hygrometers, thermometers, infrared sensors, etc., will not be repeated herein.

In addition, the electronic device 800 includes some functional modules (such as a camera) that are not shown, which will not be repeated herein.

Figure 9:
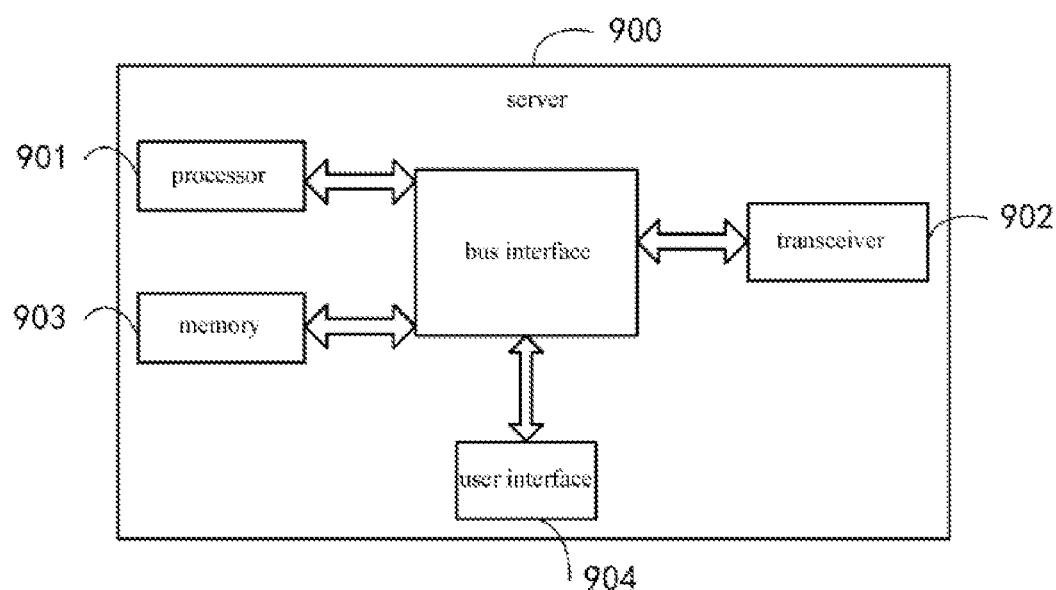
FIG. 9 is a block diagram showing a hardware structure of a server according to an example implementation.

FIG. 9 is a schematic diagram of the hardware structure of a server implementing an implementation of the application. The server 900 includes a processor 901, a transceiver 902, a memory 903, user interface 904, and a bus interface.

The memory 903 is used to store instructions executable by the processor 901. The aforementioned processor 901 is configured to execute the aforementioned instructions to implement the aforementioned method. It can be understood that the foregoing processor 901 is configured to execute any step executed by the foregoing server, which will not be elaborated herein.

In the implementation of the application, in FIG. 9, the bus architecture may include any number of interconnected buses and bridges. In some implementations of the disclosure, one or more processors represented by the processor 901 and various circuits of the memory represented by the memory 903 are linked together. The bus architecture can also link various other circuits such as peripheral devices, voltage regulators, power management circuits or the like together, which are all known in the art, and therefore, no further descriptions are provided herein. The bus interface provides the interface. The transceiver 902 may be a plurality of elements, that is, including a transmitter and a receiver, and providing a unit for communicating with various other devices on the transmission medium. For different user devices, the user interface 904 may also be an interface capable of connecting externally and internally with the required devices. The connected device includes but not limited to a keypad, a display, a speaker, a microphone, a joystick, or the like. The processor 901 is responsible for managing the bus architecture and general processing, and the memory 903 can store data used by the processor 901 in response to performing operations.

In addition, the server 900 also includes some functional modules not shown, which will not be repeated here.

In an example implementation, the implementation of the disclosure further provides a storage medium including instructions, for example, a memory including instructions, and the foregoing instructions may be executed by a processor of a server or a client device to complete the foregoing method. In some implementations of the disclosure, the storage medium may be a non-transitory computer-readable storage medium. For example, the non-transitory computer-readable storage medium may be a read-only memory (ROM) or a random access memory (RAM), CD-ROM, magnetic tape, floppy disk and optical data storage devices.

In an example implementation, the implementation of the disclosure also provides a computer program product including one or more instructions, and the one or more instructions may be executed by a processor of a server or a client device to complete the foregoing method.

It should be noted that when the instructions in the storage medium or one or more instructions in the computer program product are executed by the processor, each process of the above method implementation can be realized, and the same technical effect can be achieved. To avoid repetition, it is not repeated herein again.

Those skilled in the art will easily think of other implementations of the disclosure after considering the description and practicing the disclosure disclosed herein. The disclosure is intended to cover any variations, uses, or adaptive changes of the disclosure. These variations, uses, or adaptive changes follow the general principles of the disclosure and include common knowledge or conventional technical means in the technical field not disclosed in the disclosure. The description and the implementations are only regarded as example, and the true scope and spirit of the disclosure are pointed out by the following claims.

It should be understood that the disclosure is not limited to the precise structure that has been described above and shown in the drawings, and various modifications and changes can be made without departing from its scope. The scope of the disclosure is limited only by the appended claims.

What is claimed is:

1. A method, applied to an electronic device and comprising:
    invoking preset animation information corresponding to a preset operation instruction in response to the preset operation instruction reaching a preset condition;
    rendering the preset animation information to obtain a preset animation;
    displaying the preset animation on a current live streaming interface,
    wherein the preset operation instruction is used to express emotions to a first user corresponding to a first user account, and the first user account is a user account with preset permissions in a current live streaming room corresponding to the current live streaming interface;
    extracting N target virtual resources corresponding to the preset operation instruction from the first user account in response to the preset operation instruction reaching the preset condition, wherein N is a preset value and is a positive integer;
    determining information of a virtual red envelope according to the target virtual resource; and
    displaying the virtual red envelope on the current live streaming interface according to the information of the virtual red envelope, wherein the virtual red envelope is shielded from the electronic device that does not trigger the preset operation instruction in the current live streaming room.

2. The method according to claim 1, wherein before invoking preset animation information corresponding to the preset operation instruction, the method further comprises:
    receiving a first instruction sent by a server, wherein the first instruction is used to indicate that the preset operation instruction reaches the preset condition,
    where said invoking preset animation information corresponding to the preset operation instruction comprises:
    invoking preset animation information corresponding to the preset operation instruction according to the first instruction.

3. The method according to claim 1, further comprising:
    receiving a second instruction sent by a server, wherein the second instruction carries information of a virtual red envelope, and the second instruction is an instruction generated in response to the preset operation instruction reaching the preset condition;
    displaying the virtual red envelope on the current live streaming interface according to the information of the virtual red envelope.

4. The method according to claim 1, wherein the electronic device is a first electronic device, and the first electronic device is an electronic device that logs in the first user account,
    where said invoking preset animation information corresponding to the preset operation instruction in response to the preset operation instruction reaching the preset condition comprises:
    invoking preset animation information corresponding to the preset operation instruction in response to the first electronic device detects that the preset operation instruction reaches the preset condition.

5. The method according to claim 1, wherein the electronic device is a first electronic device, and the first electronic device is an electronic device that logs in the first user account,
    where after invoking preset animation information corresponding to the preset operation instruction, the method further comprises:
    sending the preset animation information to a second electronic device,
    wherein the first electronic device and the second electronic device are electronic devices in the current live streaming room.

6. A non-transitory storage medium, wherein instructions in the storage medium, in response to being executed by a processor of a live streaming interactive apparatus, enables the live streaming interactive apparatus to execute the live streaming interactive method according to claim 1.

7. A method, applied to a server and comprising:
    receiving a preset operation instruction sent by a second electronic device, wherein the preset operation instruction is used to express emotions to a first user corresponding to a first user account, and the first user account is a user account with preset permissions in a current live streaming room;
    sending a first instruction to a target electronic device in the current live streaming room in response to that it is detected that the preset operation instruction reaches a preset condition, wherein the first instruction is used to indicate that the preset operation instruction reaches the preset condition,
    wherein the target electronic device comprises at least one of: the second electronic device, or a first electronic device that logs in the first user account;
    extracting N target virtual resources corresponding to the preset operation instruction from the first user account in response to the preset operation instruction reaching the preset condition, wherein N is a preset value and is a positive integer;
    determining information of a virtual red envelope according to the target virtual resource; and sending a second instruction to the target electronic device, wherein the second instruction carries information of a virtual red envelope, wherein the virtual red envelope is shielded from the target electronic device that does not trigger the preset operation instruction in the current live streaming room.

8. A non-transitory storage medium, wherein instructions in the storage medium, in response to being executed by a processor of a live streaming interactive apparatus, enables the live streaming interactive apparatus to execute the live streaming interactive method according to claim 7.

9. An apparatus, comprising:
a processor;
a memory for storing instructions executable by the processor,
wherein the processor is configured to:
invoke preset animation information corresponding to a preset operation instruction in response to the preset operation instruction reaching a preset condition;
render the preset animation information to obtain a preset animation;
display the preset animation on a current live streaming interface,
wherein the preset operation instruction is used to express emotions to a first user corresponding to a first user account, and the first user account is a user account with preset permissions in a current live streaming room corresponding to the current live streaming interface;
extract N target virtual resources corresponding to the preset operation instruction from the first user account in response to the preset operation instruction reaching the preset condition, wherein N is a preset value and is a positive integer;
determine information of a virtual red envelope according to the target virtual resource; and
display the virtual red envelope on the current live streaming interface according to the information of the virtual red envelope, wherein the virtual red envelope is shielded from the electronic device that does not trigger the preset operation instruction in the current live streaming room.

10. The apparatus according to claim 9, wherein the processor is further configured to:
receive a first instruction sent by a server, wherein the first instruction is used to indicate that the preset operation instruction reaches the preset condition,
wherein the processor is further configured to invoke preset animation information corresponding to the preset operation instruction according to the first instruction.

11. The apparatus according to claim 9, wherein the processor is further configured to:
extract N target virtual resources corresponding to the preset operation instruction from the first user account in response to the preset operation instruction reaching the preset condition, wherein N is a preset value and is a positive integer;
determine information of a virtual red envelope according to the target virtual resource,
wherein the processor is further configured to display the virtual red envelope on the current live streaming interface according to the information of the virtual red envelope.

12. The apparatus according to claim 9, wherein the processor is further configured to:
receive a second instruction sent by a server, wherein the second instruction carries information of a virtual red envelope, and the second instruction is an instruction generated in response to the preset operation instruction reaching the preset condition,
wherein the processor is further configured to display the virtual red envelope on the current live streaming interface according to the information of the virtual red envelope.

13. The apparatus according to claim 9, wherein the apparatus is a first electronic device, and the first electronic device is an electronic device that logs in the first user account,
wherein the processor is further configured to invoke preset animation information corresponding to the preset operation instruction in response to the first electronic device detects that the preset operation instruction reaches the preset condition.

14. The apparatus according to claim 9, wherein the apparatus is a first electronic device, and the first electronic device is an electronic device that logs in the first user account,
wherein the processor is further configured to:
send the preset animation information to a second electronic device,
wherein the first electronic device and the second electronic device are electronic devices in the current live streaming room.

15. An apparatus, comprising:
a processor;
a memory for storing instructions executable by the processor,
wherein the processor is configured to:
receive a preset operation instruction sent by a second electronic device, wherein the preset operation instruction is used to express emotions to a first user corresponding to a first user account, and the first user account is a user account with preset permissions in a current live streaming room;
send a first instruction to a target electronic device in the current live streaming room in response to that it is detected that the preset operation instruction reaches a preset condition, wherein the first instruction is used to indicate that the preset operation instruction reaches the preset condition,
wherein the target electronic device comprises at least one of: the second electronic device, or a first electronic device that logs in the first user account,
extract N target virtual resources corresponding to the preset operation instruction from the first user account in response to the preset operation instruction reaching the preset condition, wherein N is a preset value and is a positive integer;
determine information of a virtual red envelope according to the target virtual resource; and
send a second instruction to the target electronic device, wherein the second instruction carries information of a virtual red envelope, wherein the virtual red envelope is shielded from the target electronic device that does not trigger the preset operation instruction in the current live streaming room.

* * * * *